United States Patent [19]
Ovnicek

[11] Patent Number: 4,721,165
[45] Date of Patent: Jan. 26, 1988

[54] HORSESHOE

[75] Inventor: Eugene D. Ovnicek, Kalispell, Mont.

[73] Assignee: World Wide Horseshoes, Inc., Whitefish, Mont.

[21] Appl. No.: 860,017

[22] Filed: May 6, 1986

[51] Int. Cl.⁴ ............................................. A01L 1/04
[52] U.S. Cl. ......................................... 168/24; 168/29
[58] Field of Search ................................ 168/4, 24, 29

[56] References Cited

U.S. PATENT DOCUMENTS

| 665,050 | 1/1901 | Bayless | 168/4 |
|---|---|---|---|
| 1,074,353 | 9/1913 | Donnelly | 168/29 |
| 1,951,700 | 3/1934 | Liepman | 168/29 |
| 3,153,452 | 10/1964 | Mancini | 168/24 |

FOREIGN PATENT DOCUMENTS 457588  9/1913  France .................... 168/29

Primary Examiner—Robert P. Swiatek
Attorney, Agent, or Firm—George M. Cole

[57] ABSTRACT

Horseshoe device (10) having a squared off toe portion (12) including branches (14,16) with heel portions (18,20) in which the front edge (30) of the toe portion is straight or linear across its front. The edge (30) extends under the toe of the hoof (H) an approximate predetermined distance from the hoof toe. An insert grab plate or calk (70,90) is received in a cavity on the bottom of the shoe such that the contact edge (74,92) is substantially directly below the tip of the coffin bone (C).

7 Claims, 7 Drawing Figures

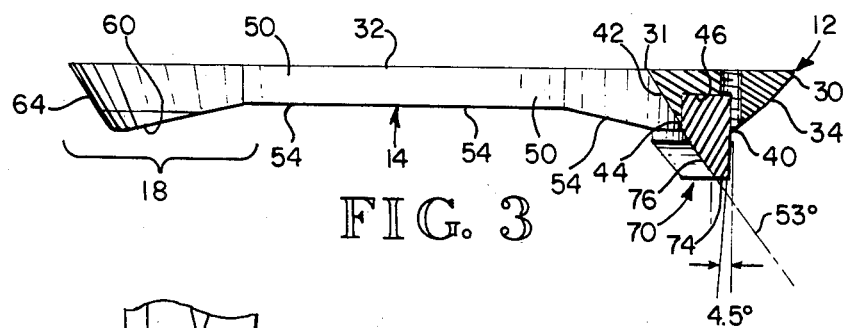
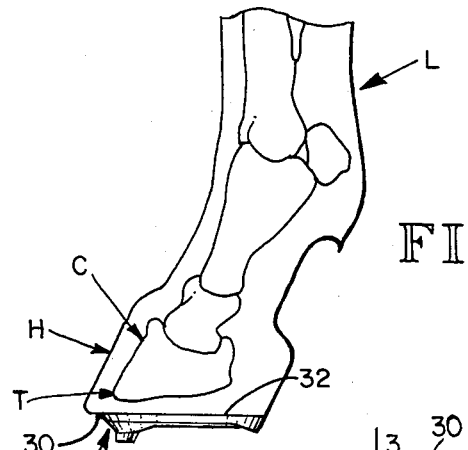
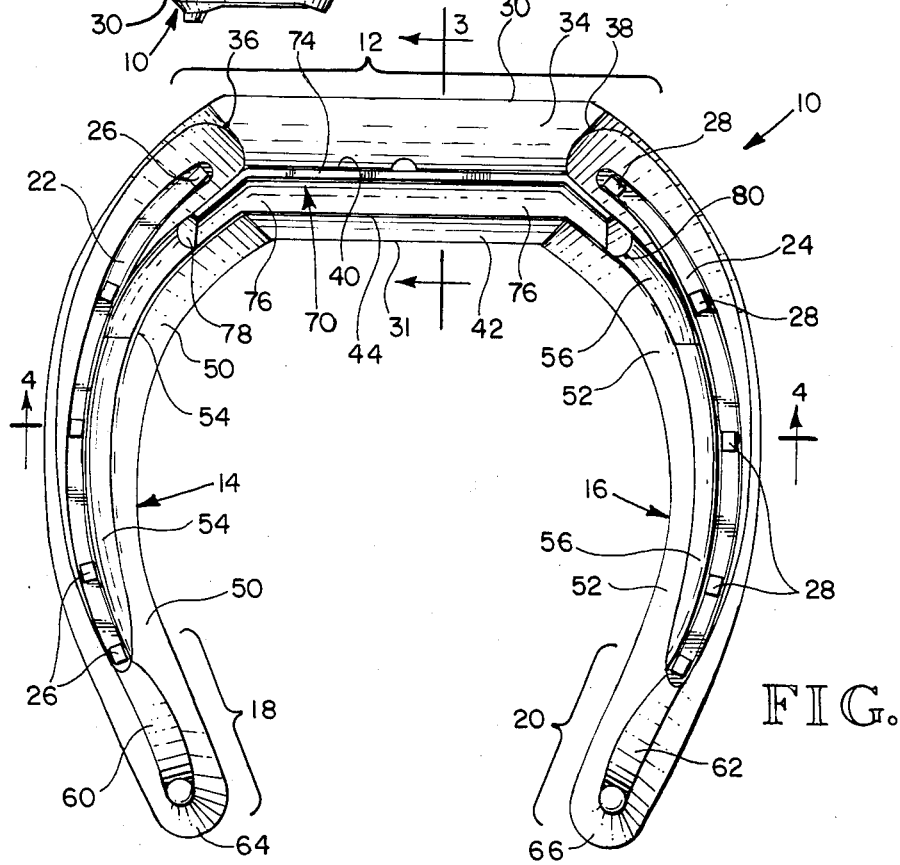

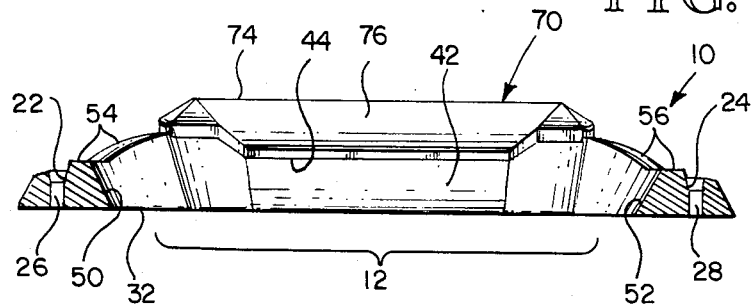
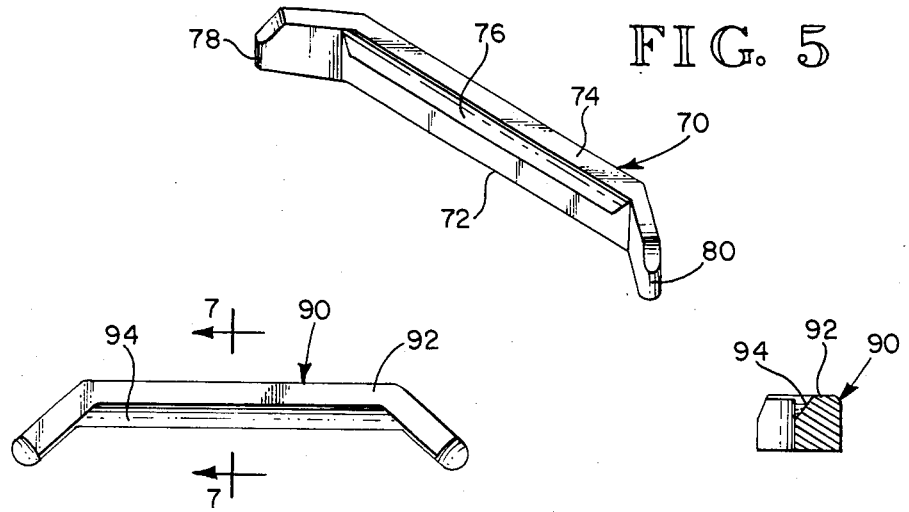

HORSESHOE

DESCRIPTION

1. Technical Field

The invention relates generally to the field of farriery and more particularly to a horseshoe design for horses' hooves which enables the animal to move with a more natural motion of its feet.

2. Background Art

As those skilled in the art, particularly farriers and veterinarians, are aware domestic horses have for a great many years been routinely shod with shoes the purpose of which was to lengthen the stride of the animal to provide traction and prevent concussion. Thus, it has been commonplace to lengthen the toe in order to accomplish the longer stride, especially in race horses. As a result horses were shod with long shoes and lowered heels in the belief that this would decrease the concussion and lengthen the stride. In point of fact research departments in farrier science have found that the opposite may be true. Studies indicate that lengthening the toe and dropping the heel decrease the hoof angle, and that in fact the old ways have been contributing factors to hoof related problems such as bowed tendons, ringbone, navicular disease, bucked shins and sesamoid problems. The longer toe and shorter heel theory has been thought to to lower the arc of the foot's flight pattern. Again, however, it has been found that it takes the hoof longer to break over and delayed breakover increases fatigue. It is to be kept in mind that breakover is the last phase of the stride prior to the hoof's leaving the ground. The end of the toe and the foot rotate over losing traction with the ground and beginning the next stride.

For race horses the desire has been to minimize stresses on the leg structure including tendons and ligaments. Tendons become pulled if the hoof comes off the ground unnaturally so that the flexor tendons are stressed and the extensors in turn are also stressed trying to compensate for the unnatural flexor action. Another common problem is that of chipped knees caused by unnatural break over placing excessive strain on the multiple bone structure. The result can be and often is that corners of the bones are chipped off. Because it is conventional and most practical to fit a shoe to the most forward part of the hoof the art of shoeing horses has perpetuated the practice of causing unnatural foot action, and thus the excessive strain on the tendon system and secondary stress on the bone structure.

Among the prior art references are the following U.S. Pat. Nos. 90,394; 100,328; 155,362; 18,980;. 421,349; 483,537; 507,276; 591,166; 562,567; 764,950; 804,839; 980,655; 998,196; and 4,333,532; 3,460,627; 3,794,120; 3,311,174; 2,791,280; and 3,159,220. None of the horseshoes shown in the prior art above are structurally or in principle similar to the shoe structure of this invention. See also HORSESHOEING THEORY AND HOOF CARE, Leslie Emery, Jim Miller, Nyles Van Hoosen, 1977, Lea & Febiger, Philadelphia.

DISCLOSURE OF THE INVENTION

The invention is a horseshoe having a closed end or toe portion which is formed to extend laterally straight across the front and under the hoof rather than being rounded to the shape of the toe of the hoof. A calk or plate grab is shaped to extend across the straight toe substantially directly under the tip of the coffin bone of the hoof. The toe is formed so that the inside edge of the toe portion angles downwardly and forwardly from about 50 to 53 degrees and the front edge of the toe angles downwardly and rearwardly so that there is no inclination for the shoe to drag or interfere through the horse's stride. The shoe is also formed so that the branches conform to a natural pattern of wear in unshod horses. The heel is raised slightly so that for racing horses the calk or grab plate is slightly higher than or even with the heel because of the soft material of race tracks. For more conventional saddle horse usage the shoe is of about equal height both front and back. It is contemplated that the calks on the heels could be higher than the grab plate on the toe.

Accordingly it is among the features and advantages of this invention to provide a horseshoe design that conforms to the natural wear pattern of a horse's hoof. The toe is formed substantially straight across so that the calk or grab plate is substantially directly under the tip of the coffin bone. The design permits the horse to employ its most natural leg and hoof action, a natural and unimpeded breakover so that stresses on the tendons and bone structure are minimized. Since the stresses are minimized the muscular structure becomes less easily fatigued. The shoe's design enables a limited amount of rotation when the shoe is fitted to a particular horse so that the shoe is square with or conforms with the angle in which the knee flexes. Thus, the horse does not have to favor an unbalanced hoof-knee action and lose any power in its stride. This shoe will allow the horse to move over the toe of its foot in a manner that is most natural for it.

BRIEF DESCRIPTION OF THE DRAWINGS

FIG. 1 is an illustrative view of the outline structure of a horse's lower leg and hoof showing the location of the coffin bone within the hoof;

FIG. 2 is a plan view of the shoe of this invention showing details of its configuration and construction;

FIG. 3 is a partial cross section view taken along the line 3—3 of FIG. 2 showing the shape of the toe section;

FIG. 4 is a cross section view taken along the line 4—4 of FIG. 2 and further illustrating details of the configuration;

FIG. 5 is a perspective view of the insert caulk or grab plate;

FIG. 6 is a plan view of the grab plate of FIG. 5; and

FIG. 7 is a cross section view taken along the line 7—7 of FIG. 6 showing additional details of the construction of the shoe of this invention.

BEST MODE FOR CARRYING OUT THE INVENTION

The history and development of today's horses show that in the wild where they live successfully, as for instance in the arid regions of the American west, the hoof shape and health depend on the specific environment and life style therein. Significantly, the finest quality horn composition and least amount of deformity in hooves occurs in these wild animals. As the horse developed the task of flexing the leg fell primarily to the deep digital flexor tendon and at the same time the importance of the navicular bone increased since it functions as a pulley or brace for the deep digital flexor tendon. Many of the guidelines for shoeing horses have come from the form the hoof assumes when the horse runs wild. From the bottom the hoof appears round, with the sole arched and free of soft, crumbly horn or layers of caked sole horn. Excess is trimmed away by the constant movement to maintain the sole at its optimum thickness.

When a naturally shaped hoof is placed on a level surface the ground surfaces of the hoof walls are well rounded, especially at the toe where the most friction occurs. The hoof wall at the toe usually appears short and the heels generally strong and wide. The front hooves exhibit this condition to a much greater degree than the hind feet. Hooves shaped under such conditions rarely have pointed toes or sharp-edged walls. Thus, a degree of upward concavity is seen across the toe between the quarters and along both branches between toe and heel. Regardless of environment, whether it is wet or dry or a combination of both, the rotation point of a hoof is always essentially directly below the tip of the coffin bone (See Emery et al reference above, pages 66 and 67).

Referring now to the drawings it will be seen that FIG. 1 shows the lower portion of a horses' leg in general outline to illustrate the principles of the instant invention. Within leg L and hoof H is the coffin bone C at the bottom of a column of leg bones to which the hoof is attached. For optimum action the hoof must break over as near the center of the toe as possible. To enable such breakover the coffin bone C is round or arcuate in shape to provide greater support on the sides. The wider form of a front hoof provides a greater area of support for the heavier weight borne by the front leg and also tends to prevent breakover to the side. The rear hooves on the other hand have straighter sides and allow lateral breakover. The tip T of the coffin bone is, as stated above, generally arcuate across the front.

The shoe, generally designated by the number 10, is shaped and shown to be attached to the hoof H so that the natural flexing is encouraged. Shoe 10 is shaped and fitted so that the grab plate or calk is generally directly under the tip T of the coffin bone.

FIGS. 2 through 7 further illustrate the principles and details of the invention. Shoe 10 has toe portion 12, branches 14 and 16, and heel portions 18 and 20 at the rear ends of the branches. The shoe is provided with fullering grooves 22 and 24 as in conventional shoes and nail holes 26 and 28 within the fullering grooves 22 and 24.

Toe portion 12 extends straight, as shown, across the front of the hoof so that the front edge 30 is recessed under the toe of the hoof by a quarter to perhaps as much as half an inch. The top surface 32 of the shoe which contacts the bottom of the hoof is essentially a flat planar surface. Front edge 30 angles rearwardly and downwardly to define front sloping surface 34 which extends across substantially the entire toe section of the shoe. Front surface 34 terminates as at lines 36 and 38 at its ends and along a line 40 at the lower edge of said slope. An inside sloped surface 42 angles downwardly and forwardly from rear toe edge 31. A lower edge 44 is spaced from edge 40. Between edges 40 and 44 is an insert or grab plate cavity 46 extending a predetermined depth up into the toe of the shoe. Preferably the angle of inside sloping surface 42 is about 50 to 53 degrees as indicated by the drawings though such angle may vary between about 45 and 55 degrees. The angle of 50 to 53 degrees will be recognized to represent the hoof angle in the average horse. The angle of inside surface 42 of the toe portion is included because it conforms to the angle of the coffin bone and because the grab plate tends to maintain its traction through a greater degree of hoof rotation.

The branches 14 and 16 of the shoe have sloping inside surfaces 50 and 52 which coincide with toe inside surface 42 and extend rearwardly to the heel portions 18 and 20. Ridge edges 54 and 56 extend from the grab plate cavity to the heel area and as can be seen in FIG. 3 the ridge edges are higher through the quarter part of the branches than near the toe or heel portions. Again, as pointed out in the general discussion of natural hoof wear, the hoof through the quarter part tends to be slightly upwardly rounded or concave. Thus, the ridge edges are shaped to reflect this natural hoof wear pattern. At the heel portion of each branch the heel has rearwardly and downwardly extending contact surfaces 60 and 62 which raise the heel portions 18 and 20. The extreme rear of each heel has a rear edge 64 or 66. It will be appreciated that the fullering grooves 22 and 24 are recessed with respect to the ridge edges 54 and 56 as is best illustrated in FIG. 43. The body of shoe 10 is preferably made of aluminum, but could be made of plastic or other metal as desired such as titanium, steel, etc.

The insert calk or grab plate. generally designated by the number 70, is a steel or other hard, well-wearing material shaped as shown. It is basically rectangular to be received in cavity 46 of the toe of the shoe except for the outer edge which contacts or grips the ground. it will be recognized that the root of the insert in cavity 46 could be of reduced cross section if desired. Thus, it is provided with an inner edge 72, outer edge 74, angled inside surface 76 which is shaped to coincide with surface 42 of the shoe toe, and ends 78 and 80. Note that the ends of the grab plate are bent at an angle to the rear to conform to the curvature in the shoe body itself. Thus the cavity 46 as well as the ends of the grab plate are shaped accordingly. The insert grab plate shown is a racing style part which is slightly higher than the heel of the shoe. For saddle and other types of horses the grab plate and heel will be approximately the same height. FIGS. 6 and 7 illustrate a grab plate 90 having a broader contact edge 92 and shorter inside sloping surface 94 which will be used as an insert for non-racing types of horses. The front surface of the insert may be relieved by a small amount of angle for fabrication purposes as seen in FIG. 3.

I claim:

1. Horseshoe device for attachment to a horse's hoof, comprising:
   (a) a generally U-shaped body made of substantially solid material and having a toe portion and a pair of arcuate branch portions with heel areas at the ends thereof, said body having a top, substantially planar, side for contacting a horse's hoof and including fullering grooves and nail holes therein for attaching said body to said hoof,
   (b) said toe portion being shaped generally linearly straight across between said branch portions so as to extend under and be spaced rearwardly of the toe of said horse's hoof a predetermined distance, said toe portion having front and rear edges extending from near said top side of said body,
   (c) said toe portion having a bottom side which includes ground engaging grab plate means with a ground contact surface thereon so that said toe portion is of a predetermined thickness, said ground contact surface being generally straight and located generally directly below the tip of the coffin bone in said hoof such that ground contact by said toe portion of said horseshoe is also generally directly below said tip of said coffin bone, (d) said grab plate means has end sections thereof which angle rearwardly such that they are of an angle coincident with the angle at which said branches extend rearwardly from said straight toe portion, said body including ridge edges extending rearwardly from the ends of said grab plate end sections, said ridge edges being thicker near said grab plate end sections and angling upwardly to define a higher and thinner ridge edge through the quarter portion of said shoe body, (e) said ground contact surface of said grab plate means and said ridge edges being located interiorly of the nail pattern of said fullering grooves such that stress on said hoof is shifted interiorly of the horn portion thereof, and (f) said branches of said horseshoe having a predetermined amount of raised and thickened area in the heels thereof.

2. The horseshoe device according to claim 1 and wherein said straight toe portion angles downwardly and rearwardly from the front edge thereof and angles downwardly and forwardly from the rear edge thereof.

3. The horseshoe device according to claim 2 and wherein said grab plate means is formed such that it has an angle surface formed to coincide generally with the angle of said toe portion which extends from said rear edge thereof.

4. The horsehoe device according to claim 3 and in which the angle of said toe portion extending downwardly and forwardly from said rear edge is substantially between about 45 and 55 degrees from the top planar side of said horseshoe.

5. The horseshoe device according to claim 4 and in which said angle is from about 50 to 53 degrees.

6. The horseshoe device according to claim 1 and wherein said raised and thickened heel areas are of less overall thickness than the combination of said toe portion and grab plate means together.

7. The horseshoe device according to claim 1 and wherein said grab plate means is an insert body made of steel.

* * * * *